(12) United States Patent
Mix

(10) Patent No.: US 8,127,916 B2
(45) Date of Patent: Mar. 6, 2012

(54) CONVEYOR APPARATUS FOR SHOCK-SENSITIVE PRODUCTS

(75) Inventor: André Mix, Vechta (DE)

(73) Assignee: Big Dutchman International GmbH, Vechta (DE)

( * ) Notice: Subject to any disclaimer, the term of this patent is extended or adjusted under 35 U.S.C. 154(b) by 674 days.

(21) Appl. No.: 12/224,645

(22) PCT Filed: Mar. 1, 2007

(86) PCT No.: PCT/EP2007/001744
§ 371 (c)(1),
(2), (4) Date: Oct. 16, 2008

(87) PCT Pub. No.: WO2007/098942
PCT Pub. Date: Sep. 7, 2007

(65) Prior Publication Data
US 2011/0094858 A1    Apr. 28, 2011

(30) Foreign Application Priority Data
Mar. 2, 2006 (DE) ................. 20 2006 003 445 U (51) Int. Cl.
*B65G 17/36* (2006.01)
(52) U.S. Cl. ............ 198/801; 198/803.14; 198/483.1; 119/337
(58) Field of Classification Search .......... 198/801, 198/803.14, 469.1, 483.1; 119/337, 338
See application file for complete search history.

(56) References Cited

U.S. PATENT DOCUMENTS

| | | | |
|---|---|---|---|
| 2,969,867 A * | 1/1961 | McClelland | 198/385 |
| 3,722,743 A * | 3/1973 | Atchley | 221/77 |
| 3,770,107 A | 11/1973 | Michelbach | |
| 4,159,696 A * | 7/1979 | Martin | 119/337 |
| 4,199,051 A | 4/1980 | Kimberley | |
| 4,345,682 A * | 8/1982 | White et al. | 198/635 |
| 4,846,337 A | 7/1989 | Kuhlmann | |
| 5,165,514 A | 11/1992 | Faulkner | |
| 5,490,591 A | 2/1996 | Faulkner | |
| 6,382,404 B1 | 5/2002 | Guldenfels | |

FOREIGN PATENT DOCUMENTS

| | | |
|---|---|---|
| DE | 2157774 | 1/1974 |
| DE | 3525460 C1 | 2/1987 |
| DE | 19906916 A1 | 8/2000 |
| EP | 0414487 A1 | 2/1991 |
| FR | 2030824 | 11/1970 |
| FR | 2780247 | 12/1999 |
| JP | 11079345 A | 3/1999 |
| JP | 11139526 A | 5/1999 |
| NL | 8002232 | 11/1981 |

* cited by examiner

*Primary Examiner* — Mark A Deuble
(74) *Attorney, Agent, or Firm* — Price Heneveld LLP (57) ABSTRACT

A conveyor and associated method for shock-sensitive products and the like, includes a conveyor member having at least one individual compartment for receiving a product therein, as well as upward and downward conveyor sections. An upper conveyor deflector deflects the conveyor member from the upward to the downward section. The compartment includes a first support surface configured for supporting the product in the upwardly directed conveyor section, as well as a second support surface configured for supporting the product in a downwardly directed conveyor section. The compartment also includes a bottom surface that supports the product during movement of the conveyor member over the upper conveyor deflector. The bottom surface has a curved shape, so that when passing over the upper deflector, the product deposited in the compartment is guided smoothly and gently along the bottom surface from the first support surface to the second support surface, such that critically damaging shock forces to the product are avoided.

19 Claims, 8 Drawing Sheets

CONVEYOR APPARATUS FOR SHOCK-SENSITIVE PRODUCTS

BACKGROUND OF THE INVENTION

The invention concerns a conveyor apparatus for shock-sensitive products and the like comprising a conveyor belt with at least one individual compartment for receiving at least one product, an upwardly directed conveyor belt section, a downwardly directed conveyor belt section, and an upper deflection means for deflecting the conveyor belt out of the upwardly directed conveyor belt section into the downwardly directed conveyor belt section, wherein the individual compartment is defined or delimited by a first support surface for supporting a product deposited therein in the upward conveying movement, a second support surface for supporting a product deposited therein in the downward conveying movement, and a bottom surface for supporting the product in the movement of the conveyor belt over the upper deflection means.

Such conveyor apparatuses are used for example in many sectors in the manufacturing industry. A typical application for such conveyor apparatuses is transporting hen eggs within a henhouse building. A typical structure of a henhouse building for egg-laying poultry provides that the cages or aviaries are arranged along a plurality of rows of cages in a mutually parallel relationship and stacked one above the other in a plurality of levels. The eggs when laid are conveyed to the end of the henhouse building by means of longitudinal conveyor belts extending along the rows at each level. It is usual for the eggs to be conveyed on the longitudinal belts of each row, that are stacked one above the other to their ends, and onto a transverse belt in order to convey them by means of the transverse belt out of the henhouse building for further processing.

In order to implement the transposition of the eggs from the longitudinal conveyor belts which are stacked vertically one above the other onto the transverse conveyor belt, use is usually made of an elevator or conveyor apparatus which takes the eggs from the individual longitudinal conveyor belts and conveys them upwardly to a deflection means, by means of an upwardly directed conveyor belt section. In that deflection means, the eggs are conveyed over the highest point of the conveyor apparatus, and are thereafter conveyed downwardly onto the transverse belt, by a downwardly directed conveyor belt section.

For that purpose, it is known to use an endless conveyor belt, which is divided by upper and lower deflection rollers into two runs, comprising an upward run and a downward run. Arranged at uniform spacings relative to each other on the conveyor belt are separating walls which extend substantially perpendicularly to the conveyor belt surface and transversely with respect to the conveyor direction and which form individual compartments between them. The eggs can be conveyed in those compartments both in the upwardly directed and also in the downwardly directed conveyor direction and, if the separating walls are of a suitable configuration, for example with a suitable front edge, it is possible, even in the case of a vertical conveyor direction, to prevent the eggs from dropping out of the compartment.

A problem with those previously known conveyor apparatuses is that the spacing between two separating walls usually has to be selected to be greater than would be required by the dimension of the egg to be conveyed. That is necessary to permit the compartments to be loaded and unloaded and in order to be able to deal with any eggs which are standing up or with variations in size among the eggs. A disadvantage which occurs as a result of that however is that the eggs must move, in the region of the upper deflection means, from the support surface involved in upward conveying to the support surface involved in downward conveying and that is typically effected by the egg rapidly rolling around within the compartment after passing over the highest point of the deflection means. As a result, the egg is frequently so greatly accelerated, and upon coming into contact with the support surface for downward conveying, experiences such a high shock force, that damage to the egg takes place.

A further disadvantage of the known conveyor apparatuses is that often they can be adapted to specific conditions within the henhouse, only through a high level of complication and expenditure. Thus, it is often desirable to select the width of each individual compartment to correspond to the eggs supplied per unit of time, and thus individually adapt the vertical conveyor apparatus to the local factors involved. Hitherto, that can only be achieved with special designs of vertical conveyor belts, and in addition, can no longer be modified subsequently, for example in the event of enlargements to the henhouse.

Finally, a further disadvantage of the known conveyor apparatuses is that they are of a predetermined structural height, due to the predetermined length of the vertical conveyor belts, and thus in this respect also can be adapted to local factors, only through a high level of complication and expenditure.

SUMMARY OF THE INVENTION

One object of the invention is to provide a vertical conveyor apparatus which reduces and preferably completely eliminates at least one of the aforementioned problems.

In accordance with one aspect of the invention, the bottom surface of the individual compartment, at least when passing through the upper deflection means, is of a curvature which is so shaped that a product deposited in the individual compartment is guided from the first support surface to the second support surface when passing through the upper deflection means in such a way that critically damaging shock forces between the product and the second support surface are avoided.

By virtue of the provision of a curvature to limit the shock force to a non-critical value, the conveyor apparatus according to the present invention provides that the products being conveyed, rolled or slid smoothly and gently from the first support surface to the second support surface, and thus the risk of damage to the product when passing through the deflection means can be considerably reduced.

The configuration of the curvature depends primarily on the geometrical configuration of the deflection means. A further important factor in regard to the configuration of the curvature is the geometry of the products being conveyed and the conveyor speed. Finally, the shock force which is safely tolerated by the product being conveyed also plays a part, as there is no need for the shock force which occurs to be reduced markedly below that threshold or indeed to zero. The curvature of the bottom surface can be achieved for example by the bottom surface being made from a suitably hard material and shaped with that curvature. Another possible option for example also provides making the conveyor belt from a soft material which is elastically deformable with a low force, and also designing the deflection means so that it shapes the conveyor belt with a corresponding curvature when passing over the deflection means. Typically, the deflection means will have a deflection roller and the curvature is in opposite relationship to the curvature of the envelope of the outside surface of that deflection roller when the conveyor belt passes through the deflection means.

In a first advantageous embodiment, the curvature of the bottom surface has a curved configuration which is opposite to the conveyor belt shape in the deflection means. In that way, the typical sudden rolling or sliding movement of a product from the first support surface to the second support surface when passing over an upper deflection means can be compensated for shortly after passing over the highest point of the deflection means, and it is possible to provide that the product rolls or slides gently from the one support surface to the other support surface, within the curved recess formed by the curvature of the bottom surface. The curvature can be provided with a uniform radius or a varying radius. The curvature can be symmetrical or asymmetrical with respect to the central plane between the two support surfaces.

In addition, it is preferable if the upper deflection means includes a deflection roller, and the curvature of the bottom surface extends in an opposite relationship to the curved shape of the deflection roller, and is of a radius of curvature which is greater than or equal to the radius of the deflection roller. That choice ensures that there cannot be any sudden rolling or sliding movement of the product between the first and second support surfaces.

It is further preferred that if the conveyor belt comprises a plurality of individual compartments, the same are preferably all designed in accordance with the features of one of the preceding claims. In that fashion the efficiency of the conveyor apparatus is optimized, and a plurality of products can be conveyed in immediately adjacent individual compartments. In that respect, it is also preferable that a plurality of products can be arranged in a mutually juxtaposed relationship in an individual compartment transversely with respect to the conveyor direction and conveyed therein. The first and second support surfaces of adjacent individual compartments can be afforded by a single wall portion, thereby making it possible to achieve ideal utilization of space along the conveyor belt.

It is particularly preferred that the conveyor belt is composed of a plurality of conveyor belt members which are coupled together. That conveyor belt structure makes it possible for the length of the conveyor belt to be selected individually by a suitable number of conveyor belt links or members being fitted together and coupled for example to afford an endless conveyor belt. Assembling the conveyor belt from a plurality of conveyor belt members in addition permits particularly advantageous manufacturing processes for the conveyor belt, as in that case, it is only necessary to produce conveyor belt members of limited dimensions, which can be produced using usual production processes. For example, an injection molding process is suitable for producing such conveyor belt members from a hard plastic material.

It is also preferably that each conveyor belt member includes at least one individual compartment. It is basically possible for a plurality of individual compartments to be arranged on a conveyor belt member, which are stacked one above the other, and which are separated from each other by a separating wall. Furthermore, it is also possible to provide individual compartments, which are arranged in a mutually juxtaposed relationship in the conveyor direction. A particularly advantageous structure for the conveyor belt, both from the viewpoint of production engineering and also conveying aspects, is afforded when each individual conveyor belt member has precisely one individual compartment which extends over a given length transversely with respect to the conveyor direction and is of a height adapted to receive a product or a plurality of mutually juxtaposed products.

In the case of the two aforementioned developments, it is further advantageous if each conveyor belt member has at least one wall portion which extends substantially perpendicularly to the conveyor direction and first and/or second support surfaces. In principle, the first and second support surfaces can be provided separately on each conveyor belt member by two suitable, mutually spaced wall portions. However, a particularly inexpensive and compact configuration provides that each conveyor belt member has only one wall portion, which extends substantially perpendicularly to the conveyor direction, and on which there are provided on one side the first or second support surfaces of that individual compartment, the bottom surface of which is formed by said conveyor belt member, and on which moreover, on the other side of the wall portion, there is provided a second or a first support surface, which acts as an adjacent second conveyor belt member coupled to the corresponding conveyor belt member. In such a case, the wall portion is preferably arranged near the coupling location of the two conveyor belt members, so as to provide a conveyor belt member which is approximately L-shaped or J-shaped in cross section, and of which a limb extends in accordance with the curvature according to the invention of the bottom surface.

It is further preferred that when the conveyor belt is composed of a plurality of conveyor belt members, which are coupled together pivotably about an axis which is transverse with respect to the conveyor direction, that each conveyor belt member has a bottom wall portion of an individual compartment and a wall portion which extends approximately perpendicularly to the conveyor direction, and provides the first or second support surface of the individual compartment and the second or first support surface, respectively, of an individual compartment of an adjacently coupled conveyor belt member. That embodiment has proven to be both robust, and also efficient in daily use, and is also distinguished by an advantageous manufacturing technology for the individual conveyor belt members and thus for the conveyor belt overall. The conveyor belt preferably extends over a given length transversely with respect to the conveyor direction, and is parallel to the pivot axis between the individual conveyor belt members in order to be able to accommodate a plurality of products in an individual compartment. In addition, a further development of the conveyor apparatus, and an enlargement in its conveyor capacity can be achieved, if a plurality of such conveyor apparatuses are arranged in mutually juxtaposed relationship, wherein the individual compartments of those conveyor belt members are aligned with each other, and thus provide respective individual compartments when there is a suitably small spacing in respect of the individual conveyor belts from each other.

It is further preferred that if a braking ramp is formed for the upward conveyance between the support surface and the bottom surface, the braking ramp is adapted so that a product, which is moved over the support surface for the upward conveyance in the direction of the bottom surface, is braked by the influence of the force of gravity before it encounters the bottom surface.

Conveyor apparatuses of the kind according to the invention are frequently charged with products in such a way that the products are supplied by way of a horizontal conveying apparatus, such as a belt conveyor or the like, and are deposited in the individual compartments of the conveyor apparatus. In that situation, the product which is supplied in such a fashion usually moves over, the first support surface of the individual compartment in the direction of the bottom surface and comes to lie in the transitional region between the first support surface and the bottom surface. Acceleration of the product, caused by the force of gravity, as it moves over the first support surface and/or the conveyor speed of the product, which still remains from being supplied by the horizontal conveyor apparatus, usually results in a situation wherein the product strikes against the bottom surface, which on the one hand can be acoustically annoying, and which also could possibly even cause damage to the product. Therefore, in accordance with one aspect of the invention there is provided a braking ramp, which guides the product upwardly against the force of gravity prior to its hitting against the bottom surface, and therefore reduces the speed of movement of the product to such an extent that impact is avoided, or is at least reduced to a level which is no longer relevant. The braking ramp can be in the form of a straight ramp surface which is directed upwardly in the direction of the force of gravity, or in the form of a surface extending in a curved configuration.

It is further preferred that, at least in the region in which a product which is moved from the support surface for upward conveyance to the bottom surface, a damping wall portion is provided in the bottom surface. That aspect of the invention is also relevant in particular in regard to the product which is delivered by the conveyor apparatus striking against the bottom surface, and it avoids mechanical loading or shock to the product, and an adverse acoustic effect on the surroundings, insofar as elastic damping in the region of the point of impact of the product provides for careful deceleration of the product and a soft gentle impact.

In that case, preferably the damping wall portion is flat and arranged step-free relative to the bottom surface. That aspect of the invention is particularly advantageous, as in the further conveying procedure, the product is moved away from the damping wall portion, and in so doing, should preferably not overcome any step in the bottom surface as that could again result in damage to the product. The damping wall portion can therefore be formed in particular by an embedded material strip, for example a foam strip, the surface of which extends continuously with the rest of the level of the bottom surface.

A further aspect of the invention is a conveyor belt member for a conveyor apparatus, comprising at least one individual compartment for receiving a shock-sensitive product with a first support surface for supporting a first product deposited therein in upward or downward conveyance, and a bottom surface for supporting the first product in the movement of the conveyor belt over an upper deflection means, in which the bottom surface of the individual compartment, at least when passing over the upper deflection means, is of a curvature which is so shaped that when passing over the upper deflection means, the first product deposited in the individual compartment is guided from the first support surface to a second support surface for supporting the product in downward or upward conveyance, respectively, in such a way that critically damaging shock force between the product and the second support surface are avoided.

Such a conveyor belt member is suitable for constructing a conveyor apparatus, as has been described hereinbefore, in modular fashion, by a plurality of conveyor belt members being coupled together in such a way that they form an interconnected conveyor belt, and possibly a plurality of such conveyor belts are arranged in a mutually juxtaposed relationship to provide a conveyor belt of a desired width.

The conveyor belt member according to the invention can have an individual compartment or a plurality of individual compartments which preferably extend transversely with respect to the conveyor belt direction and in the plane of the conveyor belt in order to be able to accommodate a plurality of products therein. The individual compartments are preferably defined or delimited by support surfaces which prevent the product deposited in the individual compartment from falling out in either the upward or downward conveyance. For that purpose, suitable support surfaces can be provided on the conveyor belt member, and/or when conveyor belt members are coupled together, product support can be affected by support surfaces on the adjacent conveyor belt member. The principle involved in the design configuration of the support surfaces can be implemented in any fashion by support surfaces for an individual compartment, or the individual compartments of a conveyor belt member being provided on the conveyor belt member itself or by such support surfaces being used when coupling two or more conveyor belt members to the adjacent conveyor belt member.

The bottom surface of the conveyor belt member is typically disposed approximately in the plane of the conveyor belt, and serves primarily to support a product deposited in the individual compartment when the conveyor belt member moves over an upper deflection means.

In accordance with one aspect of the invention, the bottom surface is curved permanently at least when passing over the upper deflection means so that when it passes through the upper deflection means, critically damaging shock forces are avoided when the product rolls or slides from the support surface for upward conveyance to the support surface for downward conveyance. For that purpose, the bottom surface can be for example rigidly curved, or it can be of such a configuration that it can form a suitable curvature when passing over the upper deflection means. The precise configuration of that curvature is dependent on various parameters, as described hereinbefore in connection with the conveyor apparatus according to the invention.

In a first advantageous embodiment of the invention, the second support surface is provided on a wall portion of the conveyor belt member. In that case, the conveyor belt member forms a configuration which is approximately U-shaped in cross section, wherein the two limbs of the U inwardly provide the first and second support surfaces and the lower arcuate portion of the U provides the curved bottom surface. That embodiment is particularly suitable when a plurality of individual compartments are provided in succession in the conveyor direction on the conveyor belt member, so that the result is a W-shaped or double-W-shaped configuration in cross section, or the like.

As an alternative to that embodiment, the second support surface can be provided on a wall portion of an adjacently coupled second conveyor belt member. In that case, for an individual compartment, which extends to the edge of the conveyor belt member, a wall portion of an adjacent conveyor belt member is used as the support surface. That embodiment is particularly suitable when each conveyor belt member has precisely one individual compartment. However, in certain uses, it is also advantageous to form combinations of the above-described development and this development, in which individual compartments arranged in the central region of the conveyor belt member are defined by wall portions of the conveyor belt member itself, and the individual compartments arranged in the edge regions or in an edge region are defined by a support surface of an adjacent conveyor belt member.

It is particularly advantageous if all conveyor belt members are of the same structure, and each has a wall portion defining a first and a second support surface. In that way, it is possible to implement production of the conveyor belt members in a manner which is advantageous from the point of view of production engineering, and the modular structure of the conveyor belt is less complicated.

It is further preferred that, if the bottom surface has a curved configuration, the curvature is concave in the direction of the individual compartment. That provides a trough configuration in which the product can roll down or slide when supported on the bottom surface, when it has to move from the first support surface to the second support surface.

It is further preferred that the bottom surface has a curved configuration which is opposite to the curved configuration of the envelope of the deflection roller over which the plurality of coupled conveyor belt members are deflected, and the curvature has a uniform radius, which is preferably larger than or equal to the radius of the deflection roller. In that way, the movement of the products along a path, which is caused by the deflection roller, can be at least compensated by the curvature of the bottom surface, or even a rolling or sliding movement of the products in a trough formed by the bottom surface can be achieved.

It is further preferred that, if there is provided a coupling means at the edge leading in the conveyor direction, the coupling means is adapted to couple the conveyor belt member, pivotably about an axis disposed transversely with respect to the conveyor direction and in the plane of the conveyor belt, to an edge of a similar conveyor belt member which trails in the conveyor direction. That coupling means can be in particular in the form of connecting elements, which are of a mutually complementary configuration, for example in the form of a plurality of interengaging hinge sleeves, which are connected together by a common spindle or in the form of spindle portions and hook-shaped or clip-shaped coupling portions which can be clipped or engaged therein.

Furthermore, it is preferred that the individual compartment extends transversely with respect to the conveyor direction and longitudinally in the plane of the conveyor belt, so as to receive a plurality of products in a mutually juxtaposed relationship. Thus a plurality of products can be received in an individual compartment. Also, arranging a plurality of conveyor belt members in a mutually juxtaposed relationship makes it possible to provide individual compartments which extend over a given length and are matched to individual situations of use.

It is further preferred that, if there is provided a lateral connecting means for rigid coupling of the conveyor belt member to a laterally adjacent conveyor belt member, they be arranged in such a way that the individual compartments of the two conveyor belt members can provide an individual compartment which extends transversely with respect to the conveyor direction and longitudinally in the plane of the conveyor belt and which can receive therein a plurality of products in a mutually juxtaposed relationship. That makes it possible to afford a modular structure by connecting in a row a plurality of conveyor belts which are formed from the conveyor belt members according to the invention, and thus allows good adaptability to given conveyor situations. The connecting means is preferably adapted for rigid coupling of the conveyor belt members, although a hinged or elastic coupling could also be advantageous for certain situations. Once again, it is appropriate for the lateral connecting means to be so designed that conveyor belt members of the same structure can be coupled together and in that way it is possible for such conveyor belt members to be connected together in a plurality of rows as desired.

It is further preferred that the conveyor belt member according to the invention be formed from a hard plastic material suitable for foodstuffs when used in areas which are relevant to foodstuff technology.

A further aspect of the invention is a conveyor belt which is composed of a plurality of intercoupled conveyor belt members of the above-described kind.

Both the conveyor belt according to the invention and also the conveyor apparatus according to the invention preferably include a plurality of the above-described conveyor belt members. The one skilled in the art will realize that features which have been described in connection with the conveyor apparatus according to the invention, the conveyor belt member according to the invention or the conveyor belt according to the invention are not limited to the respective form of product, but can be applied generally to an individual conveyor belt member, a conveyor belt apparatus or a conveyor belt.

Finally, a further aspect of the invention is a method of conveying shock-sensitive products comprising the steps of depositing a product on a first support surface of an individual compartment of a conveyor belt in an upwardly extending conveyor belt section, transferring the product onto a second support surface of the individual compartment upon deflection of the conveyor belt with the product out of the upward conveyor direction of the upwardly directed conveyor belt section into a downward conveyor direction of a downwardly extending conveyor belt section, and discharging the product from the second support surface, in which upon transfer, the product moves over a bottom surface which is curved concavely in the direction of the individual compartment, and which is so shaped that in the transfer critically damaging shock forces between the product and the second support surface are avoided.

The method according to the invention can be carried out in particular with the conveyor apparatus according to the invention, and is suitable for vertical conveying of the products.

Still a further aspect of the invention is a method of manufacturing a conveyor belt for shock-sensitive products comprising the steps of manufacturing a plurality of separate conveyor belt members with a first support surface for supporting a first product deposited therein in upward or downward conveyance, and a bottom surface for supporting the first product in the movement of the conveyor belt over an upper deflection means, wherein the bottom surface has a curvature which is so shaped that the first product deposited in the individual compartment when passing through the upper deflection means is guided from the first support surface to a second support surface for supporting the product in downward or upward conveyance, respectively, in such a way that critically damaging shock forces between the product and the second support surface are avoided, and assembling the conveyor belt members to form an interconnected conveyor belt.

The method permits a particularly versatile and modular structure of conveyor belts in different widths, different lengths, of different conveyor capacities and with different numbers of individual compartments. The method is unique in that the conveyor belt is produced in a manner which is particularly simple in terms of production engineering, wherein the conveyor belt has a particularly appropriate geometrical structure for conveying shock-sensitive products in a vertical conveyor by way of an upper deflection means from upward conveyance to downward conveyance.

In that respect it is particularly preferred that the conveyor belt members are manufactured in an injection molding method. In that way, series production of identical conveyor belt members, which can be connected to provide the conveyor belt according to the invention, can be implemented by means of an advantageous and particularly suitable mass production method.

A further aspect of the method provides that in the region of the bottom surface, in which a product moves from the first support surface to the bottom surface and strikes against the bottom surface, a damping wall portion is provided, preferably in the same injection molding mold, for example by means of two-component injection molding. In that way, a damping wall portion, which serves the above-described purpose of impact damping for a product, can be produced without additional complicated and expensive manufacturing steps by suitable adaptation of the injection molding tool. In addition, the two-component injection molding method permits the damping wall portion to be embedded in the bottom surface region in flush relationship with respect to the surface thereof in a particularly simple and reliable fashion.

These and other advantages of the invention will be further understood and appreciated by those skilled in the art by reference to the following written specification, claims and appended drawings.

BRIEF DESCRIPTION OF THE DRAWINGS

A preferred embodiment is described with reference to the drawings in which.

DETAILED DESCRIPTION OF THE PREFERRED EMBODIMENTS

Figure 1:
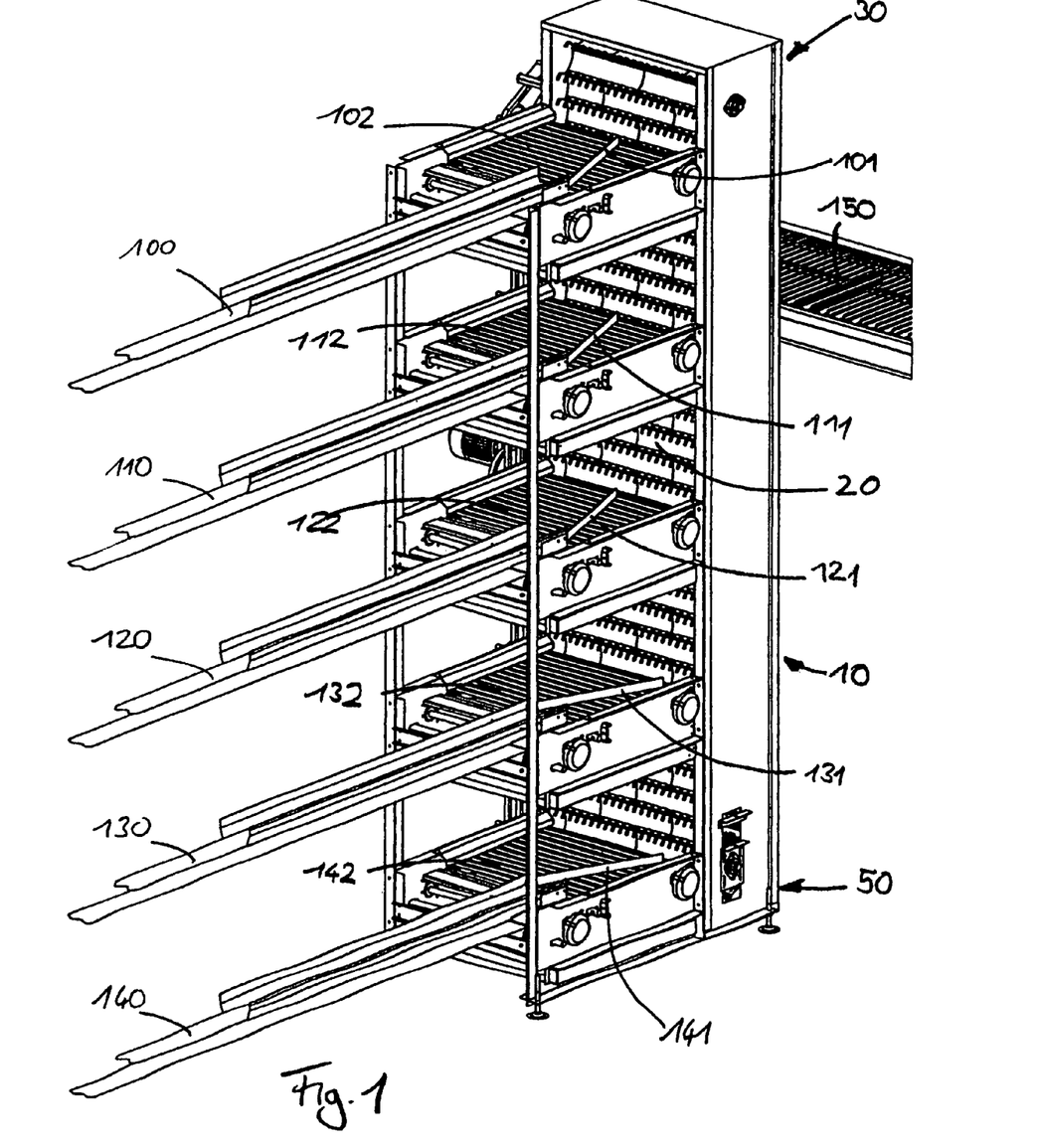
FIG. 1 shows a perspective view inclined from above at the front of an egg elevator according to the invention with a longitudinal conveyor belt arrangement which is stacked vertically in a quintuplicate configuration and a transverse belt.

For purposes of description herein, the terms "upper", "lower", "right", "left", "rear", "front", "vertical", "horizontal" and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
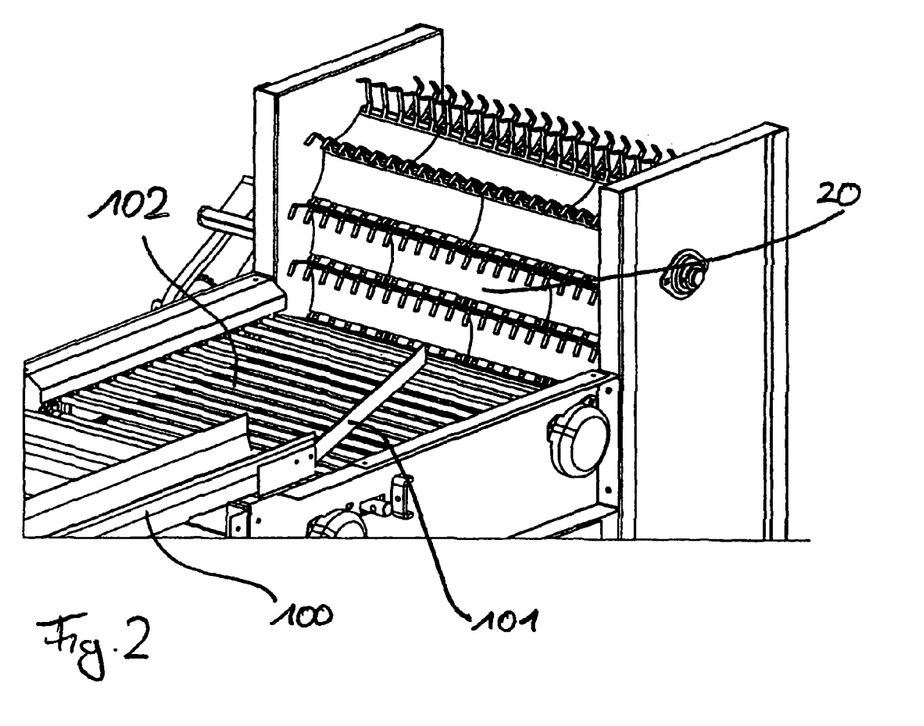
FIG. 2 shows a perspective detailed view of the deflection region of the egg elevator of FIG. 1 with the cover plate removed.

The egg elevator 10 shown in FIGS. 1 and 2 serves to convey hen eggs which are delivered by way of longitudinal conveyor belts 100-140 of which only a respective end portion is shown in the Figures on to a transverse belt 150. Each longitudinal conveyor belt 100-140 is of a width which is somewhat larger than the eggs being conveyed and conveys the eggs to a respective bar belt conveyor 102-142 which is wider than the corresponding longitudinal conveyor belt 100-140. The bar belt conveyor 102-142 is approximately as wide as the egg elevator 10 and serves to convey the eggs supplied by the longitudinal conveyor belts to the egg elevator and in so doing distributes them over the width of the egg elevator in such a way that no collisions occur between eggs which are already deposited in an individual compartment and eggs which are freshly conveyed thereto in levels thereabove.

The egg elevator 10 comprises a conveyor belt with an upwardly moving conveyor belt run 20, an upper deflection region 30, a downwardly moving conveyor belt run 40 which is not visible in FIGS. 1 and 2, and a lower deflection means 50. The conveyor belt which provides the conveyor belt runs 20 and 40 is in the form of an endless conveyor belt and experiences a change in direction in the upper and lower deflection means 30, 50.

The conveyor belt 20, 40 and the bar belt conveyors 102-142 are of a conveyor and bar belt width, respectively, which is substantially identical and which makes it possible for a number of eggs that is sufficient for the size of henhouse or laying capacity to be conveyed at a conveyor speed which is the maximum possible for reliable operation.

Each longitudinal conveyor belt 100-140 feeds the eggs to a respective bar belt conveyor 102-142 having a deflector device 101-141 which is so designed that the eggs delivered by the longitudinal conveyor belt are passed to a given region of the conveyor belt 20, 40. Each region extends over a given width of the conveyor belt 20, 40 and the regions to which the eggs delivered by the individual longitudinal conveyor belts are distributed on the bar belt conveyors at the five levels do not overlap, thereby ensuring that an egg is never guided into a region in which an egg from a bar belt conveyor disposed therebeneath has already been deposited.

The eggs which are deposited in the upwardly directed conveyor belt run 20 pass through the upper deflection means 30 and are thereafter conveyed in the downwardly directed conveyor belt run 40 to the transverse belt 150 and deposited thereon.

Figure 3:
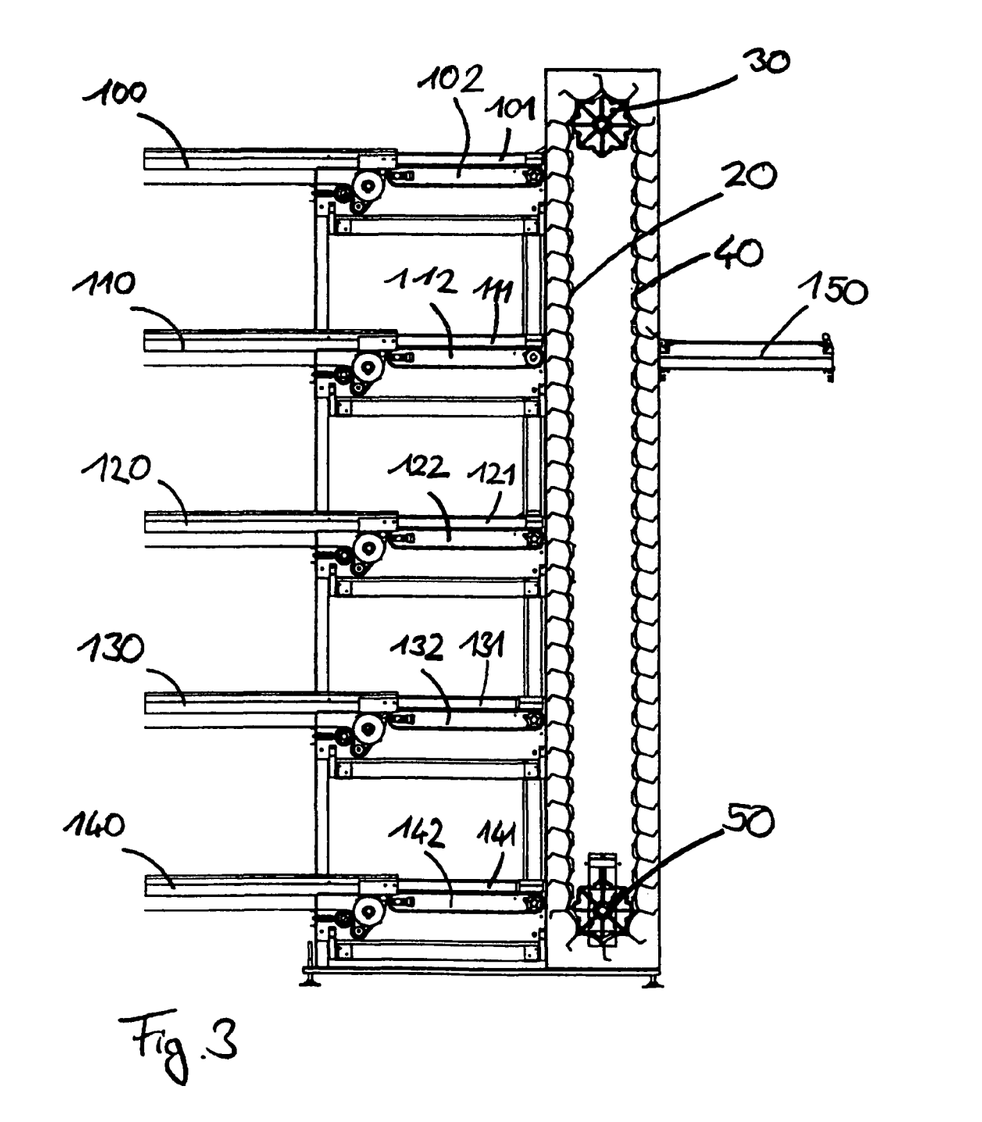
FIG. 3 shows a diagrammatic side view in partial section of the egg elevator of FIG. 1.

As can be clearly seen from FIG. 3, the longitudinal belt conveyors 100-140 and the bar belt conveyors 102-142 are vertically equally spaced from each other and stacked one above the other. Each bar belt conveyor 102-142 conveys the eggs into the vertically extending, vertically upwardly conveying conveyor belt run 20 and deposits them in an individual compartment of the conveyor belt 20, 40.

In the illustrated example the transverse belt 150 is arranged at the height of the second highest longitudinal conveyor belt 110, but it could be arranged at any height along the downwardly directed conveyor belt run 40.

Figure 4:
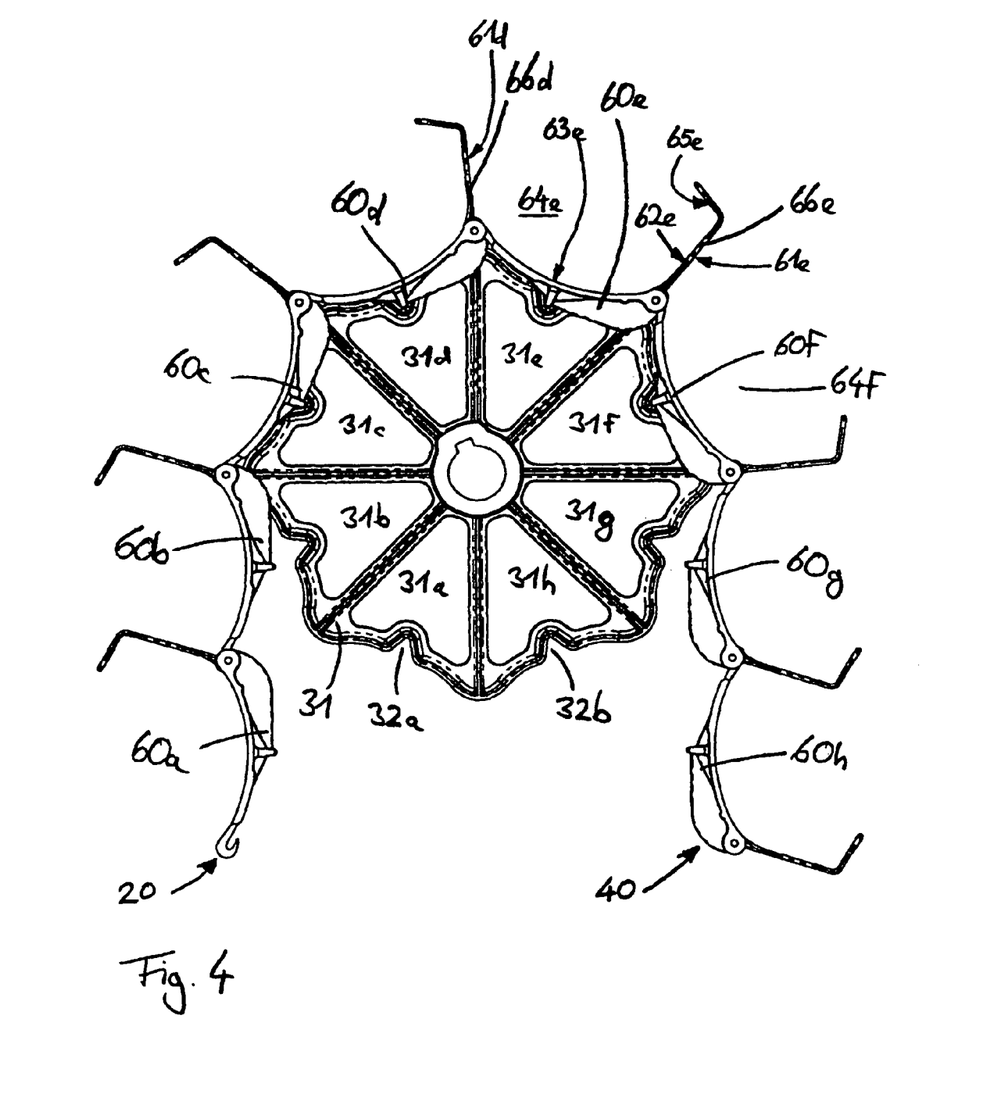
FIG. 4 shows a side view in section of an upper deflection means of an egg elevator according to the invention with the conveyor belt applied thereto.

The upper deflection means 30 with the conveyor belt placed thereon can be seen as a side view in FIG. 4. The conveyor belt has a plurality of mutually coupled conveyor belt members 60a-h. Each conveyor belt member is of an identical structure. The structure of each conveyor belt member will be described by way of example with reference to the conveyor belt member 60e.

Figure 5:
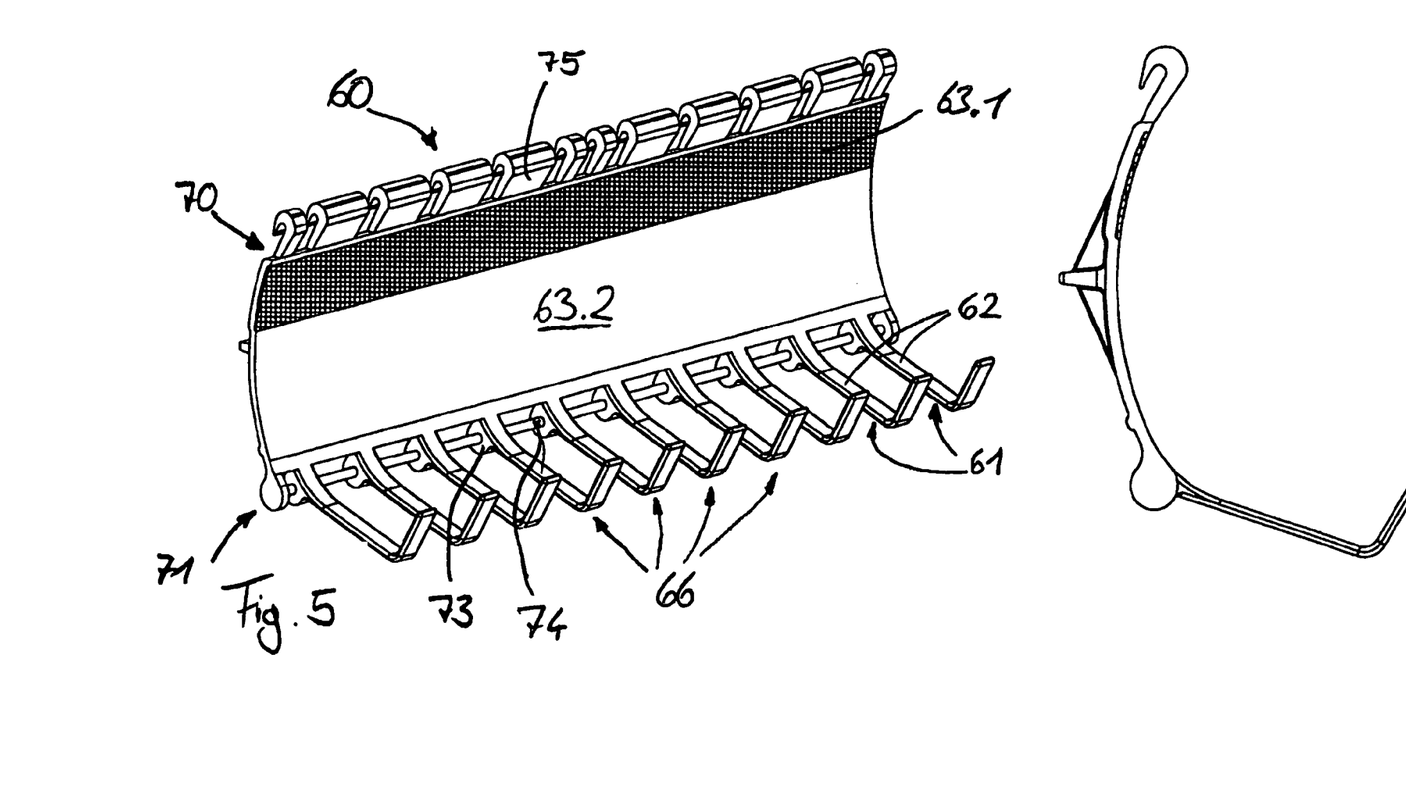
FIG. 5 shows a perspective view of a second embodiment of an individual conveyor belt member according to the invention.
Figure 6:
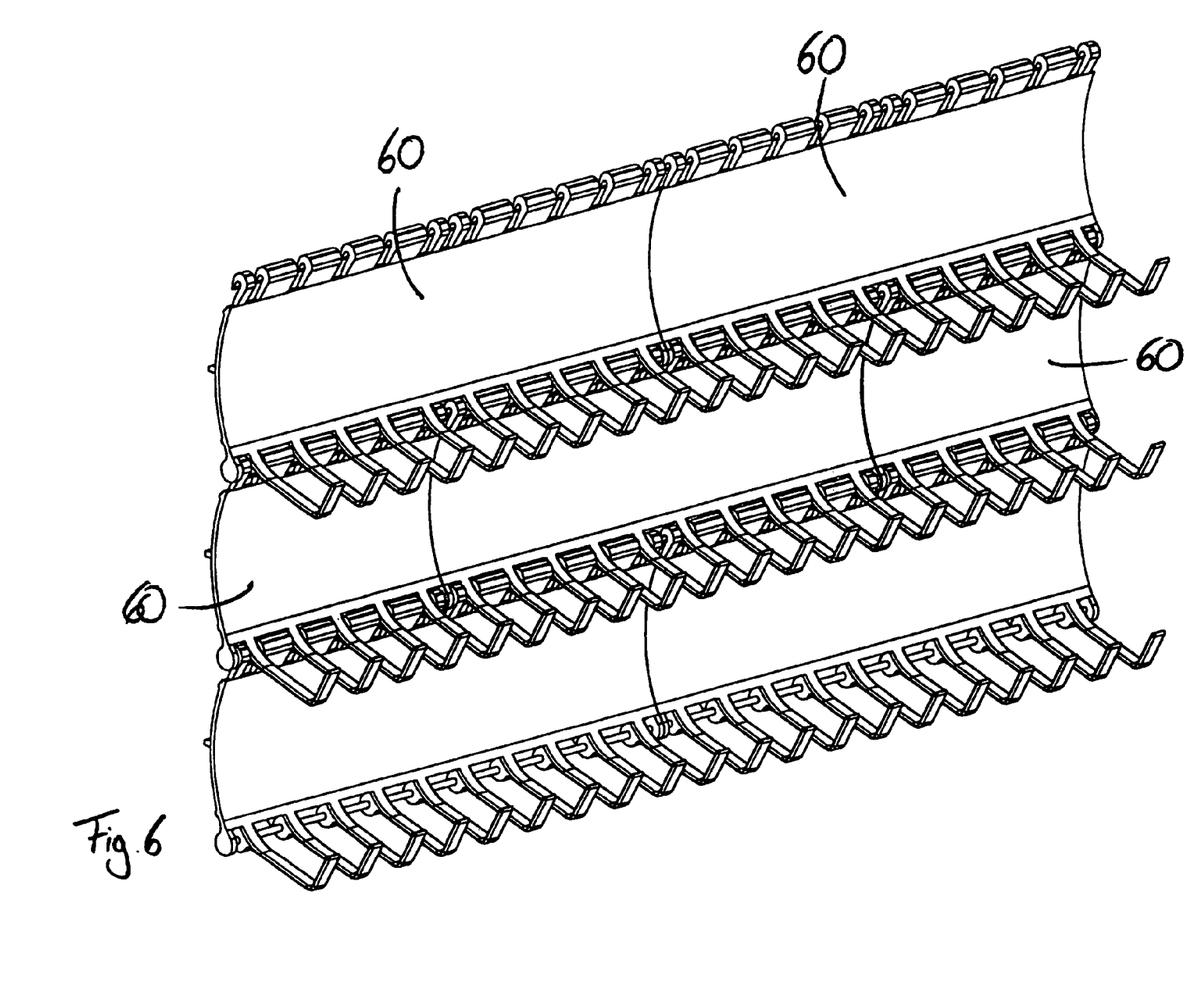
FIG. 6 shows a perspective view of a portion of a conveyor belt according to the invention composed of seven individual conveyor belt members.
Figure 7:
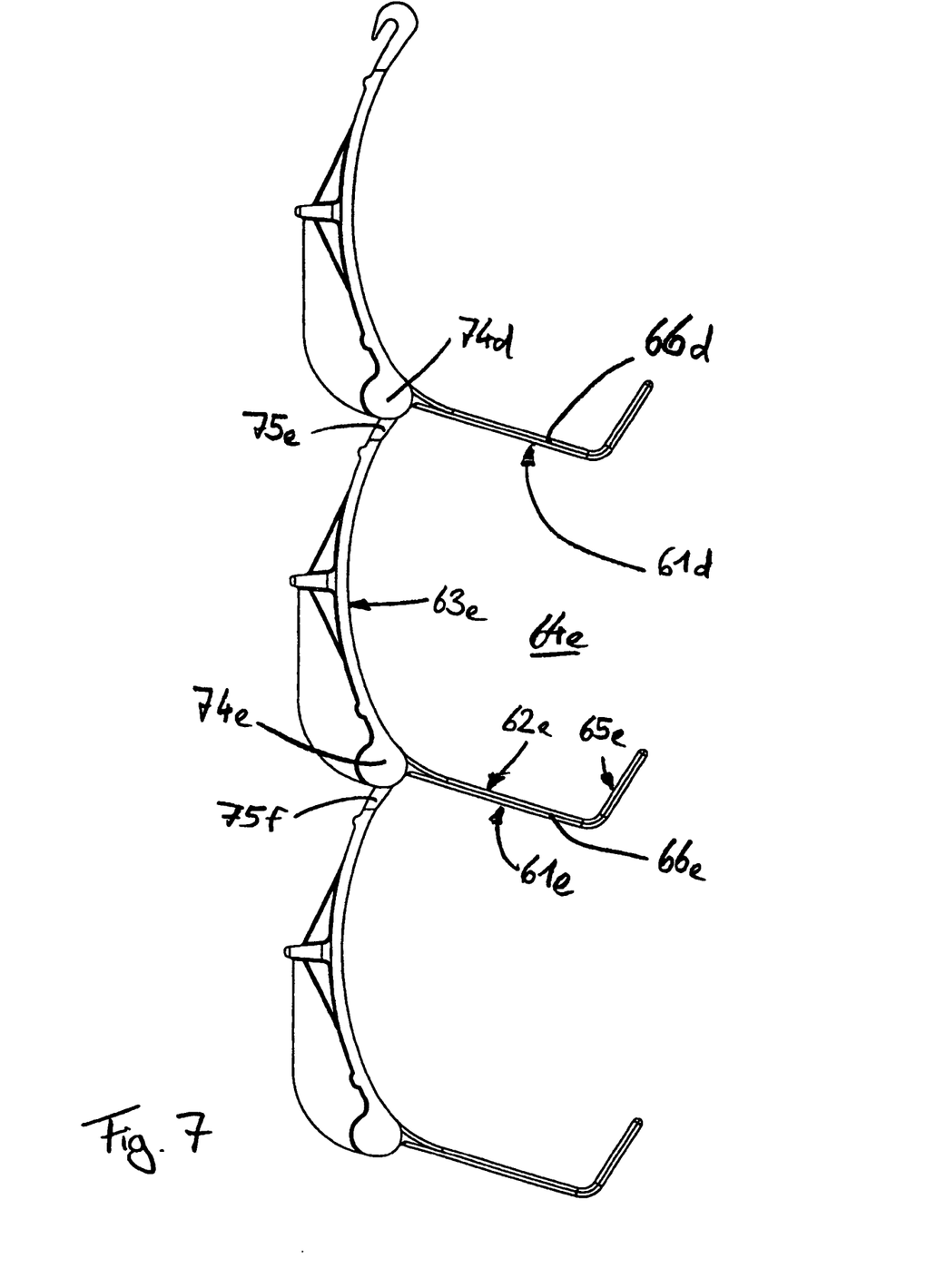
FIG. 7 shows a side view of the conveyor belt portion of FIG. 6.

The conveyor belt member 60e has a first support surface 61e formed by a plurality of parallel bars 66e which are arranged in a mutually juxtaposed relationship transversely relative to the conveyor direction, as can be seen from FIGS. 4, 5 and 6.

A further support surface 62e is formed on the rear side of the support surface 61e. A bottom surface 63e of full surface area is integrally connected to the bars 66e providing the support surfaces 61e, 62e.

The bottom surface 63e serves to support a product deposited in an individual compartment 64e of the conveyor belt member 60e when it passes through the upper deflection means. The first support surface 61e extends inclined outwardly and upwardly in the upwardly moving conveyor belt run so that a product deposited in the adjacent individual compartment 64f is safely deposited in upward conveyance in the upwardly directed conveyor belt run on the first support surface 61e. The first support surface 61e thus serves as a first support surface for the adjacent compartment 64f. In a corresponding fashion, a first support surface 61d of a conveyor belt member adjacent on the other side serves as a first support surface for a product deposited in the individual compartment 64e upon upward conveyance.

The deflection means 30 includes a rotatably mounted deflection roller 31 which in the illustrated example involves the basic shape of an octagon and has eight receiving portions 31a-h extending over a portion of the periphery for precisely one respective conveyor belt member.

Each partial segment 31a-h has a radially inwardly directed notch 31a-g to receive a correspondingly shaped rib on the rear side of the bottom surface 63e of each conveyor belt member and thereby makes a positively locking connection between the deflection roller and the conveyor belt.

The second support surface 62e is inclined obliquely outwardly and downwardly in the downwardly directed conveyor belt run 40 so that products deposited in the individual compartment 64e can roll radially outwardly away from the bottom surface. So that those products cannot roll out of the individual compartment 64e, the bars which form the support surface 62e are bent over approximately at a right angle at their outer ends so that their ends face upwardly in the downwardly directed conveyor belt run. A product deposited in the individual compartment 64e therefore rolls outwardly until it comes to bear against the support surfaces 62e, 65e. The support surfaces 62e, 65e thus form a second support surface for supporting the products upon downward conveyance.

The bottom surface 63e is curved in a uniform radius of curvature radially inwardly in relation to the deflection roller 31 so it forms a concavely curved trough, toward the individual compartment 64e. In that way, when passing through the deflection means 30, an egg can roll gently from the lower support surface 61d along the bottom surface 63e until it rolls along the support surface 62e to the support surface of the bent-over tips 65e. The radius of curvature of the bottom surface 63e is so selected that, when passing through a deflection means 30 with the illustrated deflection radius, it ensures that the egg which rolls from the lower support surface 61d to the upper support surface 62e, 65e does not suffer any damage when striking against the upper support surface 62e, 65e.

The embodiment shown in FIG. 5 is substantially identical to the conveyor belt members shown in the other Figures, but has a bottom surface which is subdivided into a first bottom surface portion and a second bottom surface portion. The first bottom surface portion is a damping wall portion 63.1 extending over the entire width of the conveyor belt member, in the form of a material strip comprising a damping foam material and is arranged in a region in which the eggs delivered to the conveyor belt member by the bar belt conveyors strike thereagainst after having rolled over the support surface 61. The damping action of the damping wall portion 63.1 is achieved by reversible, local, elastic deformation of the foam material in the impact region of the egg. The second bottom surface portion 63.2 is made from the same material as the rest of the conveyor belt member and is substantially non-elastic and non-plastic in its behavior in relation to the eggs, in contrast to the damping wall portion. The transition between the damping wall portion 63.1 and the second bottom surface portion 63.2 extends horizontally and transversely relative to the conveyor direction and is flat by the foam material being embedded into a recess, the depth of which corresponds to the thickness of the foam material.

As shown in FIG. 5, provided at both sides of the bottom surface 63.1, 63.2 of the conveyor belt member 60 is a coupling means 70, 71. Arranged in the region of the second bottom surface portion 63.2, in which it goes into a plurality of bars 66, is a spindle 72 which extends transversely with respect to the conveyor direction and in the longitudinal direction of the bottom surface 63.1, 63.2 and which is guided in a plurality of spindle eyes which are provided integrally at the foot of each bar of the second support surface 62.

A respective free spindle portion 74 of the spindle 72 is arranged between each of the spindle eyes 73. Projections 75 can latch into the free spindle portions 74, the projections 75 being formed at the opposite side of the bottom surface 63 and being bent over in a hook shape at their ends. In that way, the conveyor belt member 60 can be coupled on the side of the coupling means 71 thereof to a coupling means 70 of a similar conveyor belt member 60 in such a way that a pivotal movement about the spindle 72 between the two coupled conveyor belt members is possible, as shown in FIG. 6.

Figure 8:
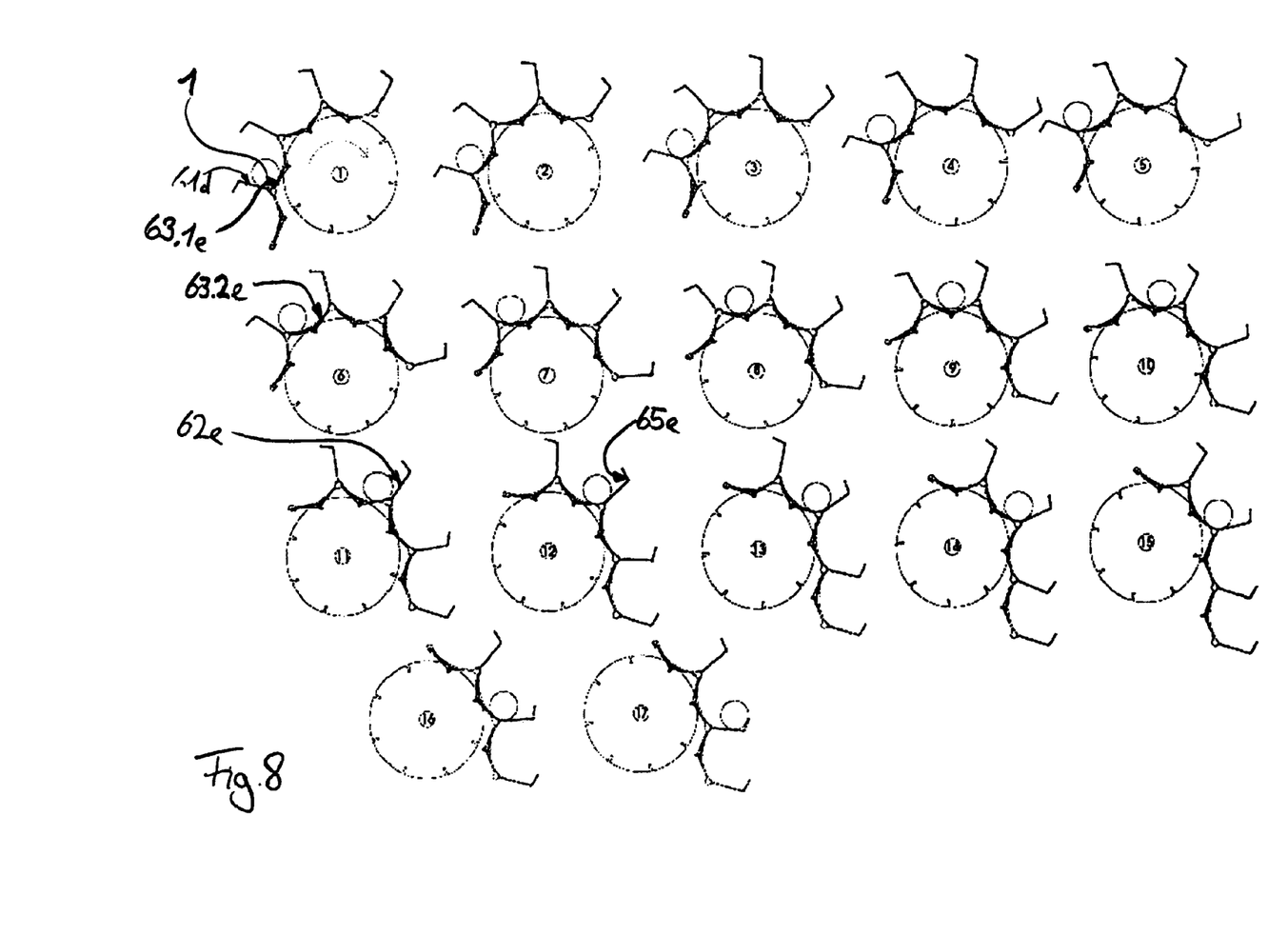
FIG. 8 shows a procedure in seventeen sub-sequences involved in the passage of an egg in a product compartment of the conveyor belt according to the invention through an upper deflection means.

The course of movement of an egg 1, when passing through the upper deflection means, can be seen in FIG. 8 in sequence in seventeen positions, arranged from top left to bottom right.

Sequence position 1 shows the situation shortly after the egg has rolled over the first support surface 61 and has hit against the bottom surface. In the case of the embodiment shown in FIG. 5 the egg now bears against the damping wall portion 63.1 and the first support surface 61.

In the sequence positions 1 to about 5, the egg 1 rests on the first support surface 61d. From about the sequence image 6, the individual compartment 64e passes over the highest point of the deflection means 30, in which case the egg 1, under the effect of the force of gravity, is always at the lowest point of the curved bottom surface 63e and rolls on the bottom surface 63e.

Approximately from the sequence image 12, the egg is in contact with the upper support surface 62e, and remains in that position approximately as far as the sequence image 16. Between the sequence image 16 and the sequence image 17, the egg rolls radially outwardly to the bent-over tip 65e and thereafter bears securely against the upper support surface 62e, 65e in order to be deposited on the transverse belt.

In the illustrated embodiment, the transitions between the lower support surface 61d, the bottom surface 63e and the upper support surface 62e are substantially continuous, with no significant change in the direction of the surface, that is to say, they are substantially rounded off. That however is not necessarily required. What is essentially crucial in regard to the mode of operation of the apparatus according to the invention in the illustrated embodiment is that the bottom surface is curved with a radius of curvature selected to correspond to the deflection roller in order to ensure that the egg rolls safely and slowly from the lower support surface to the upper support surface.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A conveyor for shock-sensitive products and the like, comprising:
   a conveyor member having:
   at least one individual compartment for receiving an associated shock-sensitive product therein;
   an upwardly directed conveyor section; and
   a downwardly directed conveyor section;
   an upper conveyor deflector deflecting the conveyor member from said upwardly directed conveyor section to said downwardly directed conveyor section; and wherein
   said compartment includes:
   a first support surface configured for supporting the shock-sensitive product deposited thereon in said upwardly directed conveyor section;
   a second support surface configured for supporting the shock-sensitive product deposited thereon in said downwardly directed conveyor section;
   a bottom surface configured for supporting the shock-sensitive product during movement of said conveyor member over said upper conveyor deflector, wherein said bottom surface of said compartment has a curvature shaped so that when passing over said upper deflector, the shock-sensitive product deposited in said compartment is guided smoothly and gently along said bottom surface from said first support surface to said second support surface such that critically damaging shock forces to the shock-sensitive product are avoided; and wherein
   said upper conveyor deflector includes a deflection roller; and
   said curvature of said bottom surface extends in an opposite relationship to the curved shape of said deflection roller, and is of a radius of curvature which is greater than or equal to the radius of said upper deflection roller.

2. A conveyor as set forth in claim 1, wherein:
   said conveyor comprises a plurality of said individual compartments.

3. A conveyor as set forth in claim 2, wherein:
   said conveyor is composed of a plurality of conveyor belt members which are coupled together.

4. A conveyor as set forth in claim 3, wherein:
   each said conveyor belt member includes at least one said individual compartment.

5. A conveyor as set forth in claim 3, wherein:
   each said conveyor belt member has at least one wall portion which extends substantially perpendicularly to the conveyor direction adjacent to one of the first and second support surfaces.

6. A conveyor as set forth in claim 1, wherein:
   said conveyor is composed of a plurality of conveyor members which are coupled together pivotably about an axis which is transverse with respect to the conveyor direction, and each said conveyor member has a bottom wall portion of an individual compartment and a wall portion which extends approximately perpendicularly to the conveyor direction, which provides one of said first and second surfaces of a first one of said individual compartments, as well as one of said second and first support surfaces on a next adjacent, second one of said individual compartments which is coupled therewith.

7. A conveyor for shock-sensitive products and the like, comprising:
   a conveyor member having:
   at least one individual compartment for receiving an associated shock-sensitive product therein;
   an upwardly directed conveyor section; and
   a downwardly directed conveyor section;
   an upper conveyor deflector deflecting the conveyor member from said upwardly directed conveyor section to said downwardly directed conveyor section; and wherein
   said compartment includes:
   a first support surface configured for supporting the shock-sensitive product deposited thereon in said upwardly directed conveyor section;
   a second support surface configured for supporting the shock-sensitive product deposited thereon in said downwardly directed conveyor section;
   a bottom surface configured for supporting the shock-sensitive product during movement of said conveyor member over said upper conveyor deflector, wherein said bottom surface of said compartment has a curvature shaped so that when passing over said upper deflector, the shock-sensitive product deposited in said compartment is guided smoothly and gently along said bottom surface from said first support surface to said second support surface such that critically damaging shock forces to the shock-sensitive product are avoided; and
   a shock absorbing foam damping wall portion disposed along a trailing portion of said bottom surface with respect to the conveyor direction, over which the shock sensitive products roll during movement from said first support surface to said second support surface.

8. A conveyor as set forth in claim 7, wherein:
   said damping wall portion is arranged step-free relative to said bottom surface.

9. A conveyor member for conveyors used to transport shock-sensitive products and the like of the type having an upwardly directed conveyor section, a downwardly directed conveyor section and an upper conveyor deflection roller deflecting said conveyor member from the upwardly directed conveyor section to the downwardly directed conveyor section; said conveyor member comprising:
   at least one individual compartment for receiving an associated shock-sensitive product therein, and having a first support surface configured for supporting the shock-sensitive product deposited thereon in upward or downward conveyance;
   a second support surface configured for supporting the shock-sensitive product deposited thereon in downward or upward conveyance;
   a bottom surface configured for supporting the shock-sensitive product during movement of said conveyor member over the upper conveyor deflector, wherein said bottom surface of said compartment has a curvature shaped so that when passing over the upper deflector, the shock-sensitive product deposited in said compartment is guided smoothly and gently along said bottom surface from said first support surface to said second support surface such that critically damaging shock forces to the shock-sensitive product are avoided; and wherein
   said bottom surface has a curved configuration which is opposite to the curved configuration of the upper conveyor deflection roller with which a conveyor composed of a plurality of said coupled conveyor members is deflected, and has a uniform radius of curvature which is greater than or equal to the radius of the upper conveyor deflection roller.

10. A conveyor member as set forth in claim 9, wherein:
    said second support surface is disposed on a wall portion of said conveyor member.

11. A conveyor member as set forth in claim 9, wherein:
said second support surface is disposed on a wall portion of an adjacently coupled second conveyor member.

12. A conveyor member as set forth in claim 11, wherein:
said first and second conveyor members are of similar structure, and each has a wall portion which defines said first support surface and said second support surface.

13. A conveyor member as set forth in claim 9, wherein:
said compartment has a leading portion and a trailing portion, with a first coupling member disposed at the leading portion which is adapted to couple said conveyor member pivotably about an axis disposed transversely with respect to the conveyor direction and in the plane of the conveyor to a second coupling member disposed at the trailing portion of a next adjacent similar conveyor member.

14. A conveyor member as set forth in claim 9, including:
said individual compartment extends transversely with respect to the conveyor direction and longitudinally in the plane of the conveyor, and can receive a plurality of products in a mutually juxtaposed relationship.

15. A conveyor member as set forth in claim 9, including:
a lateral connecting member for rigid coupling of said conveyor member to a second conveyor member arranged beside said conveyor member in the conveyor direction in such a way that said individual compartments of said conveyor members can provide an individual compartment which extends transversely with respect to the conveyor direction and longitudinally in the plane of said conveyor and which can receive a plurality of products in a mutually juxtaposed relationship.

16. A conveyor member as set forth in claim 9, wherein:
said conveyor member is formed from a hard plastic material suitable for foodstuffs.

17. A conveyor member as set forth in claim 9, including:
a plurality of intercoupled ones of said conveyor members which are coupled together pivotably about an axis which is transverse with respect to the conveyor direction, and each said conveyor member has a bottom wall portion of an individual compartment and a wall portion which extends approximately perpendicularly to the conveyor direction, which provides one of said first and second surfaces of a first one of said individual compartments, as well as one of said second and first support surfaces on a next adjacent, second one of said individual compartments which is coupled therewith.

18. A method for making a conveyor for shock-sensitive products and the like, comprising:
forming a plurality of separate conveyor members, each having:
a first support surface configured for supporting a shock-sensitive product deposited thereon for upward or downward conveyance;
a second support surface configured for supporting the shock-sensitive product deposited thereon in downward or upward conveyance;
a bottom surface configured for supporting the shock-sensitive product during movement of the conveyor member over the upper conveyor deflector, wherein the bottom surface has a curvature shaped so that when passing over the upper deflector, the shock-sensitive product is guided smoothly and gently along the bottom surface from the first support surface to the second support surface, such that critically damaging shock forces to the shock-sensitive product are avoided; and
assembling the separate conveyor members to form an interconnected, elongate, flexible, endless conveyor; and wherein
said forming step includes two-component injection molding a damping wall portion in that portion of the bottom surface, where the product moves from the first support surface to the bottom surface and first strikes against the bottom surface.

19. A method as set forth in claim 18, wherein:
said forming step includes injection molding the conveyor members.

* * * * *

UNITED STATES PATENT AND TRADEMARK OFFICE
CERTIFICATE OF CORRECTION

| | | |
|---|---|---|
| PATENT NO. | : 8,127,916 B2 | Page 1 of 1 |
| APPLICATION NO. | : 12/224645 | |
| DATED | : March 6, 2012 | |
| INVENTOR(S) | : André Mix | |

It is certified that error appears in the above-identified patent and that said Letters Patent is hereby corrected as shown below:

Column 5
Line 55, "are" should be --is--.

Column 14
Claim 7, lines 27-28, "shock sensitive" should be --shock-sensitive--.
Claim 9, line 41, "and having a first" should be --and having ¶ a first--.

Signed and Sealed this
Fifth Day of June, 2012

David J. Kappos
*Director of the United States Patent and Trademark Office*